Nov. 8, 1938.                J. D. ALTEMUS                2,136,034
                      TRAP AND MOUNTING THEREFOR
                         Filed Nov. 22, 1935
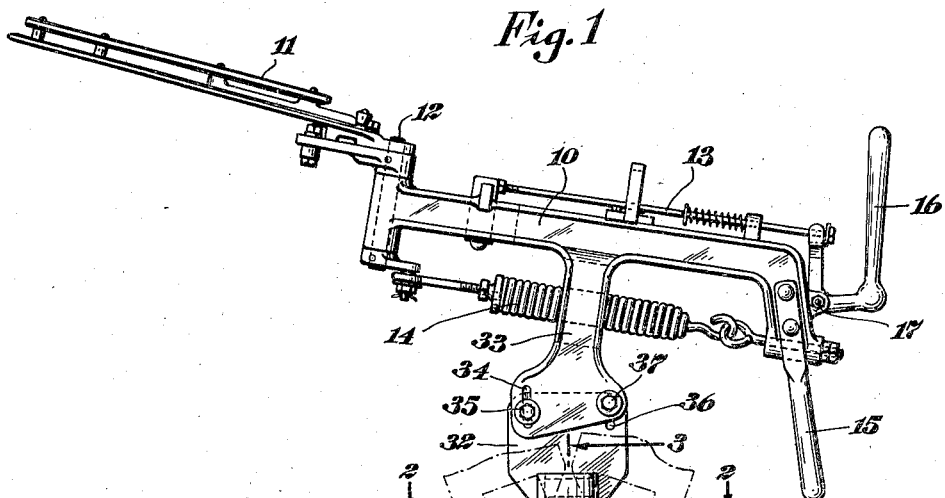
INVENTOR,
James D. Altemus,
BY Frederick Breitenfeld
ATTORNEY.

Patented Nov. 8, 1938

2,136,034

UNITED STATES PATENT OFFICE 2,136,034

TRAP AND MOUNTING THEREFOR

James D. Altemus, Roslyn, N. Y.

Application November 22, 1935, Serial No. 51,036

5 Claims. (Cl. 248—181)

My present invention relates generally to catapults, and has particular reference to an improved trap for hurling targets into the air.

My invention is primarily adaptable to traps of the type in which a pivoted throwing arm is carried by a frame which is in turn mounted in pivoted relationship to a base, whereby an operator may load and reload the device and project a series of clay targets or the like into the air. I have chosen to illustrate such a device in the present drawing, but it will be understood that certain phases of my invention are not necessarily restricted in their applicability to any specific type of target thrower.

It is a general object of my invention to provide a trap which is so improved, particularly in connection with the mounting of the trap upon a base, that the operation of the device is greatly simplified, capable of better control, and permitting much greater variety in the angularity of propulsion of a series of projectiles.

I am aware of the fact that traps have been customarily mounted in adjustable relationships to a base, so that a certain degree of variation may be effected with respect to the direction in which targets are projected. The adjustments available are, however, of such a limited character, and usually require such time-consuming manipulations, that where a series of targets are to be propelled in relatively rapid succession, the general direction is usually substantially the same in each case. It frequently happens, therefore, that a person is a good marksman at trap shooting, but is very poor indeed when it comes to shooting birds in the field, because a covey will usually rise from the ground in widely varying directions.

A trap constructed in accordance with my present invention is capable of manipulation by a single operator to project into the air, in relatively rapid succession, a series of targets traveling in widely different directions; and the present type of trap is, therefore, unusually efficient in simulating the conditions which usually confront the hunter in the field.

Among the features of construction which contribute to the unusual and novel capabilities of the present trap, are the employment of a gimbal joint to articulate the trap to a base; the provision of a frictional arrangement which permits the operator to keep the trap under better control at all times; and the provision of specially arranged handles which enable the trap to be rapidly and accurately aimed and fired.

I achieve the foregoing objects, and such other objects as may hereinafter appear or be pointed out, in the manner illustratively exemplified in the accompanying drawing, wherein—

Figure 1 is a side elevational view of a trap constructed in accordance with the present invention;

Figure 2 is an enlarged cross-sectional view taken substantially along the line 2—2 of Figure 1; and Figure 3 is a fragmentary cross-sectional view taken substantially along the line 3—3 of Figure 1.

The trap proper may be of any customary character, and the details of it form no part of the present invention. Accordingly, they will be but briefly referred to. I have shown a frame 10 to which a throwing arm 11 is pivoted, as at 12, the reference numeral 13 being applied to a releasing mechanism. As will be understood by those skilled in the art, the trap is loaded by swinging the arm 11 rearwardly into a latched position, during which time the spring 14 is stressed. After the targets have been applied in desired position onto the arm 11, and after the trap is properly aimed, the manipulation of the releasing mechanism 13 causes the throwing arm 11 to swing forwardly into the position shown in Figure 1, under the action of the spring 14, whereby the target or targets are propelled into the air.

In accordance with my present invention, a handle 15 is rigidly secured to the rear end of the frame 10, and a second handle 16 is pivoted to the frame, as at 17, and serves as a trigger for the releasing mechanism 13. Both of these handles are arranged in substantially vertical positions, as shown in Figure 1, so that they may be grasped by the hands of an operator. The handle 15 fulfills an aiming function, and is manipulated very much like a pistol grip in swinging the forward end of the trap in a desired direction. Pulling rearwardly upon the trigger handle 16 effects an operation of the releasing mechanism.

The principal features of my invention reside in the novel means for mounting the trap upon a base. At 18 I have shown a typical foundation of concrete or the like upon which a hollow base 19 is rigidly mounted by means of bolts or studs 20 or the like. The base 19 is substantially dome-shaped, and has a central opening 21 at the top. Through this opening a trap-supporting member or post 22 projects upwardly, and while this element is referred to herein and in the claims as a "post" it will be observed that it need not necessarily be solid but is, in fact, preferably of tubular nature so as to reduce its weight. Near its upper end, the post is provided with a circumferential groove 23, and at the inner end it is articulated by means of a gimbal joint to the base 19.

More particularly, in viewing Figure 3, it will be observed that the lower end of the post 22 merges into the two spaced arms 23', between which a member 24 is pivotally mounted, the journal pieces 25 being rotatably mounted in the arms 23', and being in alignment with each other. The member 24 has been shown in the form of a ring, but it may partake of any other suitable configuration. At 90° from the axis of the pivots 25 a second set of pivots is arranged, one of the journal pieces being designated in Figure 3 by the reference numeral 26. The opposite journal, while not shown in Figure 3, is aligned with the journal 26. Both journals 26 are pivotally mounted within bosses 27 provided on the interior of the base 19 itself. The journals 26 are in alignment with each other, and their pivot axis coincides with, and is at right angles to, the pivot axis of the journals 25. The member 24, and the journals and bearings associated therewith, constitute what is referred to herein and in the appended claims as a "gimbal joint", and by this term I intend to allude to an articulation of the character illustrated.

It is desirable, though not absolutely essential, that the post 22 have the integral arcuate skirt 28 which lies closely adjacent to, but not in contact with, the inner surface of the dome-shaped base 19.

Mounted on the post 22, for movement therewith, is an outer skirt 29 which is also arcuate in contour and which carries at its free edge an annular friction member or band 30 which bears constantly against the outer surface of the base 19 in the region surrounding the top opening 21.

Snugly mounted upon the post 22 is a sleeve or equivalent member 31 which is integrally formed with an upwardly extending web 32 adapted to support the trap thereon. Preferably, though not necessarily, the frame 10 of the trap has a depending foot 33 which is adjustably secured to the web 32. For example, I have illustratively shown a slot 34 in the foot 33, adapted to engage with a nut and bolt type of clamp 35; and I have shown the web 32 provided with a pair of spaced openings 36 through either of which a nut and bolt type of clamp 37 may be passed. Thus, in Figure 1, the clamp 37 is in engagement with the upper opening 36; and the clamp 35 is positioned nearer the lower end of the slot 34. This positions the frame 10 at approximately the angle shown. If the angle is to be smaller, with reference to the horizontal, the slot 34 might be pushed downwards; or if the angle is to be increased relative to the horizontal, the clamp 37 might be engaged with the opening 36.

The sleeve 31 has a boss 38 thereon through which a screw-threaded stud engages, a handle 40 being mounted on the outer end, and the inner end being rounded and adapted to engage within the groove 23. A lock nut 41 is also mounted on the stud 39 and bears against the outer end of the boss 38. The purpose of this arrangement is to secure the sleeve to the post in a manner which permits the sleeve to be rotated around the post, but which locks it against axial movement relative to the post. While the handle 40 may, if desired, be tightened sufficiently to clamp the sleeve securely and immovably to the post, it is preferable to fix the lock nut 41 in a position whereby the inner end of the stud rides within the groove 23 but does not clamp tightly against the post.

Interposed between the lower end of the sleeve 31 and the skirt 29 is a relatively strong compression spring 42.

The trap is operated as follows: The adjustments with respect to the clamps 35 and 37 are first made to suit the particular purpose for which the trap is to be used. These adjustments, once made, are not varied during the operation of the trap. The operator of the trap then positions himself behind it so that he can conveniently grasp the handle 15 with one hand and the handle 16 with the other. First he swings the arm 11 rearwardly and loads it; and he may then adjust the trap into a large variety of positions, as indicated by the dot-and-dash lines in Figures 1 and 3 and the arrows of Figure 2. The pressure of the spring 42 against the skirt 29, thereby pressing the friction member 30 against the base 19, constantly yieldably, impedes the freedom of movement of the post 22 to an extent which is sufficient to keep the trap under the complete control of the operator. The pressure is not so great, however, that the operator may not, with considerable ease, tilt the trap into any desired angular position within approximately the limits indicated by the dot-and-dash lines. When the desired adjustment has been made, the operator merely pulls the handle 16 and the target or targets are thereupon propelled into the desired direction.

The unusual advantage of the present trap, as compared with the ordinary one, is that the operator can almost immediately reload the trap and fire a target into an entirely different direction. No cumbersome manipulations are necessary. The engagement of the stud 39 with the groove 23 permits him at once to swing the entire trap around a vertical axis, as indicated by the arrows of Figure 2, and the handle 15 is constantly under his control so as to permit him to tilt the target into any of a large variety of positions. In this way, the targets that are propelled may be caused to simulate, quite closely, the birds which would rise from cover in the field.

In general, it will be understood that changes in the details, herein described and illustrated for the purpose of explaining the nature of my invention, may be made by those skilled in the art, without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. A trap mounting comprising a hollow dome-shaped base having a central opening at the top, a trap-supporting post projecting upwardly out of the base through said opening, said opening having a substantially greater diameter than said post, a gimbal joint articulating the lower end of the post to the base, a friction member movable with the post and bearing against the outer surface of the base in the region adjacent to said top opening, and a spring operatively interposed between the post and base for constantly pressing said friction member against said surface, so as to constantly impede the freedom of movement of said post.

2. A trap mounting comprising a hollow base, a post projecting upwardly out of the base, a gimbal joint articulating the lower end of the post to the base on the interior of the latter, a sleeve around the post, means for securing the sleeve to the post to permit rotation of the sleeve but not axial movement thereof relative to the post, a friction member movable with the post and arranged to bear constantly against the outer surface of said base, and a compression spring between said sleeve and friction member to press the latter constantly against the base.

3. A trap mounting comprising a fixed base, a trap-supporting member extending upwardly from said base, a gimbal joint articulating said member to said base, and means constantly yieldably impeding the pivotal movements of said member relative to said base, whereby said member may be rapidly shifted from one to another of varying angularities relative to the base and yieldably retained in any selected position.

4. A trap mounting comprising a fixed base, a trap-supporting member extending upwardly from said base, a gimbal joint articulating said member to said base, and means movable with said member and frictionally engaging said base for exerting a constant yieldable impedance upon the pivotal movements of said member relative to said base, whereby said member may be rapidly shifted from one to another of varying angularities relative to the base and yieldably retained in any selected position.

5. A trap mounting as set forth in claim 3, said trap-supporting member comprising a post, a sleeve around the post, means for securing the sleeve to the post to permit rotation of the sleeve but not axial movement thereof relative to the post, and means for supporting the trap upon said sleeve.

JAMES D. ALTEMUS.